US012669629B2

(12) United States Patent
Kumar et al.

(10) Patent No.: US 12,669,629 B2
(45) Date of Patent: Jun. 30, 2026

(54) SYSTEM AND METHOD FOR SEISMIC SURVEY DESIGN

(71) Applicant: SCHLUMBERGER TECHNOLOGY CORPORATION, Sugar Land, TX (US)

(72) Inventors: Rajiv Kumar, Crawley (GB); Massimiliano Vassallo, Crawley (GB); Alexander Zarkhidze, Crawley (GB); Franck Le Diagon, Crawley (GB); Gary Poole, Crawley (GB); Robert Bloor, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/123,780

(22) PCT Filed: Dec. 7, 2023

(86) PCT No.: PCT/US2023/082828
§ 371 (c)(1),
(2) Date: Apr. 24, 2025

(87) PCT Pub. No.: WO2024/129488
PCT Pub. Date: Jun. 20, 2024

(65) Prior Publication Data
US 2026/0009920 A1     Jan. 8, 2026

Related U.S. Application Data

(60) Provisional application No. 63/387,210, filed on Dec. 13, 2022.

(51) Int. Cl.
*G01V 1/38*     (2006.01)
*G01V 1/30*     (2006.01)
(Continued)

(52) U.S. Cl.
CPC ............ *G01V 1/3808* (2013.01); *G01V 1/303* (2013.01); *G01V 1/325* (2013.01); *G01V 1/46* (2013.01)

(58) Field of Classification Search
CPC ...... G01V 1/3808; G01V 1/303; G01V 1/325; G01V 1/46; G01V 1/305; G01V 1/181;
(Continued)

(56) References Cited

U.S. PATENT DOCUMENTS

2010/0003984 A1     1/2010   Seo
2012/0008459 A1     1/2012   Coste
(Continued)

FOREIGN PATENT DOCUMENTS

CA          2124675 C   * 12/2001   .............. G01V 1/34
FR          3027688 A1 * 4/2016   ............. G01V 1/303
(Continued)

OTHER PUBLICATIONS

International Search Report and Written Opinion of International Patent Application No. PCT/US2023/082828 dated on Apr. 19, 2024, 09 pages.
(Continued)

*Primary Examiner* — Daniel Pihulic
(74) *Attorney, Agent, or Firm* — Kyle R. Miiller

(57)     ABSTRACT

A system and method for designing a seismic survey including selecting a seismic survey grid as a basis for a seismic survey design and looping through the steps of generating off-the-grid locations by imposing spatial or temporal constraints on on-the-grid locations, mapping the off-the-grid locations from a physical domain to a pre-selected domain by applying a multidimensional transform to the off-the-grid locations, mapping the pre-selected domain to a rank-revealing domain using a pre-selected operator, applying a pre-selected process to minimize a rank of the off-the-grid locations in the pre-selected domain, and updating the
(Continued)

seismic survey design based on which of the off-the-grid locations has the minimum rank until a pre-selected threshold is met indicating an optimal seismic survey design. The system and method include acquiring seismic data using the optimal seismic survey design, and enabling performing a wellsite action based at least on the seismic data.

19 Claims, 15 Drawing Sheets

(51) Int. Cl.
  *G01V 1/32*          (2006.01)
  *G01V 1/46*          (2006.01)
(58) Field of Classification Search
  CPC ........ G01V 1/186; G01V 1/226; G01V 1/003;
                                              G01V 1/40
  See application file for complete search history.

(56)                  References Cited

U.S. PATENT DOCUMENTS

| | | | |
|---|---|---|---|
| 2016/0170055 A1 * | 6/2016 | Archer | G01V 1/36 |
| | | | 702/14 |
| 2019/0310387 A1 | 10/2019 | Eick | |
| 2019/0391286 A1 | 12/2019 | Hardouin | |
| 2020/0333491 A1 * | 10/2020 | Bekara | G01V 1/3808 |
| 2021/0033741 A1 | 2/2021 | Li | |
| 2026/0009920 A1 * | 1/2026 | Kumar | G01V 1/003 |
| 2026/0009921 A1 * | 1/2026 | Kumar | G01V 1/3808 |
| 2026/0009922 A1 * | 1/2026 | Zarkhidze | G01V 1/3808 |

FOREIGN PATENT DOCUMENTS

| | | | | |
|---|---|---|---|---|
| FR | 3036210 A1 * | 11/2016 | .............. | G06F 17/11 |
| WO | WO-2024129488 A1 * | 6/2024 | .............. | G01V 1/305 |
| WO | WO-2024145100 A2 * | 7/2024 | ........... | G01V 1/3808 |
| WO | WO-2024206600 A1 * | 10/2024 | ........... | G01V 1/3861 |

OTHER PUBLICATIONS

Akerberg, P. et al., "Simultaneous Source Separation By Sparse Radon Transform", 78th Annual Meeting, SEG-2008-2801, 2008, pp. 2801-2805, SEG, Expanded Abstracts.

Beasley, C. J. et al., "A New Look At Simultaneous Sources", 68th Annual Meeting, SEG Expanded Abstracts, 1998, pp. 133-135.

Berkhout, A. J., "Changing The Mindset In Seismic Acquisition", The Leading Edge, 2008, pp. 924-938.

Candes, E. J. et al., "Stable Signal Recovery From Incomplete And Inaccurate Measurements", Communications On Pure And Applied Mathematics, vol. LIX, 2006, pp. 1207-1223.

Candes, E. J. et al., "Robust Uncertainty Principles: Exact Signal Reconstruction From Highly Incomplete Frequency Information", 2004, 39 pages.

Hays, D. B. et al., "Blended Acquisition And Deblending Processing Of 3D Ocean Bottom Node Data", EAGE Workshop on Land & OVN survey, Apr. 2014, pp. 1-5, European Association of Geoscientists & Engineers, Earth Doc.

Hennenfent, G. et al., "Simply Denoise: Wavefield Reconstruction Via Jittered Under Sampling", Geophysics, 2008, 73(3), pp. V19-V28, SEG Library.

Kumar, R. et al., "Inherent Challenges Of Randomized Shooting Strategies On Deblending And A Robust Multistage Prior Based Solution", In 82nd EAGE Annual Conference & Exhibition, Oct. 2021, pp. 1-5, European Association of Geoscientists & Engineers, Earth Doc.

Kirkpatrick, S. et al., "Optimization By Simulated Annealing", Science, 1983, 220(4598), pp. 671-680.

Lopez, O. et al., "Spectral Gap-Based Seismic Survey Design", IEEE Transactions on Geoscience and Remote Sensing, vol. 61, 2023, pp. 1-9.

Moore, I. et al., "Simultaneous Source Separation Using Dithered Sources", 78th Annual Meeting, SEG Technical Program Expanded Abstracts, 2008, pp. 2806-2810.

Mosher, C. et al., "Increasing The Efficiency Of Seismic Data Acquisition Via Compressive Sensing", The Leading Edge, Apr. 2014, 33(4), pp. 386-391.

Sahin, R. et al., "A Simulated Annealing Heuristic For The Dynamic Layout Problem With Budget Constraint", Proceedings of 6th International Symposium on Intelligent and Manufacturing Systems, Oct. 2008, 13 Pages.

Zhang, Y. et al., "A Simulation-Free Seismic Survey Design By Maximizing The Spectral Gap", Second International Meeting for Applied Geoscience & Energy, 2022, pp. 1-10.

Yu, S. et al., "Off-The-Grid Vertical Seismic Profile Data Regularization By A Compressive Sensing Method", Geophysics, 85(2), 2020, , pp. V157-168, Geo Science World.

* cited by examiner

Figure 1A:
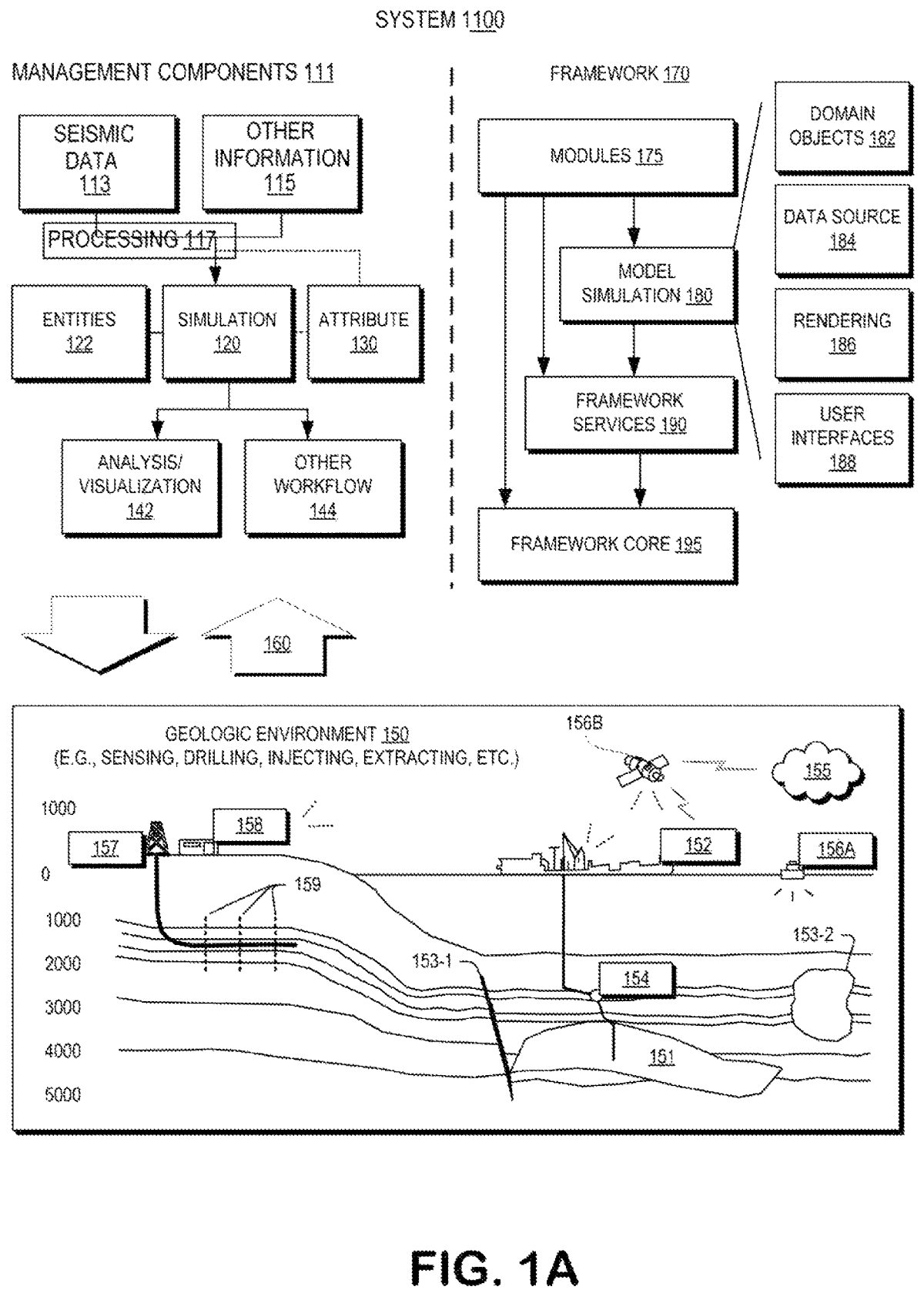

SYSTEM 1100

MANAGEMENT COMPONENTS 111

FRAMEWORK 170

SEISMIC DATA 113

OTHER INFORMATION 115

PROCESSING 117

ENTITIES 122

SIMULATION 120

ATTRIBUTE 130

ANALYSIS/ VISUALIZATION 142

OTHER WORKFLOW 144

MODULES 175

MODEL SIMULATION 180

FRAMEWORK SERVICES 190

FRAMEWORK CORE 195

DOMAIN OBJECTS 182

DATA SOURCE 184

RENDERING 186

USER INTERFACES 188

160

GEOLOGIC ENVIRONMENT 150
(E.G., SENSING, DRILLING, INJECTING, EXTRACTING, ETC.)

```
                    ( Start )
                        │
                        ▼
┌─────────────────────────────────────────────────────────────┐
│  selecting a seismic survey grid as a basis for a seismic     │──402
│  survey design                                                │
└─────────────────────────────────────────────────────────────┘
                        │
                        ▼
┌─────────────────────────────────────────────────────────────┐
│  generating off-the-grid locations by imposing spatial or     │──404
│  temporal constraints on on-the-grid locations                │
└─────────────────────────────────────────────────────────────┘
                        │
                        ▼
┌─────────────────────────────────────────────────────────────┐
│  mapping the off-the-grid locations from a physical domain    │──406
│  to a pre-selected domain by applying a multidimensional      │
│  transform to the off-the-grid locations                      │
└─────────────────────────────────────────────────────────────┘
                        │
                        ▼
┌─────────────────────────────────────────────────────────────┐
│  mapping the pre-selected domain to a rank-revealing domain   │──408
│  using a pre-selected operator                                │
└─────────────────────────────────────────────────────────────┘
                        │
                        ▼
┌─────────────────────────────────────────────────────────────┐
│  applying a pre-selected process to minimize a rank of the    │──410
│  off-the-grid locations in the pre-selected domain            │
└─────────────────────────────────────────────────────────────┘
                        │
                        ▼
┌─────────────────────────────────────────────────────────────┐
│  updating the seismic survey design based on which of the     │──412
│  off-the-grid locations has the minimum rank                  │
└─────────────────────────────────────────────────────────────┘
                        │
                        ▼
┌─────────────────────────────────────────────────────────────┐
│  repeating steps 402-412 for a number of iterations until a   │──414
│  pre-selected threshold is met indicating an optimal seismic  │
│  survey design (optional)                                     │
└─────────────────────────────────────────────────────────────┘
                        │
                        ▼
┌─────────────────────────────────────────────────────────────┐
│  acquiring seismic data using the optimal seismic survey      │──416
│  design                                                       │
└─────────────────────────────────────────────────────────────┘
                        │
                        ▼
                  ( FIG. 4B )
```

FIG. 4A

SYSTEM AND METHOD FOR SEISMIC SURVEY DESIGN

CROSS-REFERENCE TO RELATED APPLICATIONS

This application is a National Stage Entry of International Application No. PCT/US2023/082828, filed on Dec. 7, 2023, which claims priority to U.S. Provisional Patent Application No. 63/387,210, filed on Dec. 13, 2022, which is incorporated by reference herein.

BACKGROUND

The current practice of survey design involves manually creating source and receiver locations on a periodic grid with random dithers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for designing a seismic survey. The method also includes (a) selecting a seismic survey grid as a basis for a seismic survey design. The method also includes (b) generating off-the-grid locations by imposing spatial or temporal constraints on on-the-grid locations, where the spatial or temporal constraints include a range of pre-selected offsets from the on-the-grid locations, the off-the-grid locations configured to collect OBN sparse data. The method also includes (c) mapping the off-the-grid locations from a physical domain to a pre-selected domain by applying a multidimensional transform to the off-the-grid locations, where the pre-selected domain is a wavenumber domain or a sparsity promoting domain, and where the multidimensional transform is a Fourier transform when the pre-selected domain is a wavenumber domain. The method also includes (d) mapping the pre-selected domain to a rank-revealing domain using a pre-selected operator. The method also includes (e) applying a pre-selected process to minimize a rank of the off-the-grid locations in the pre-selected domain, wherein the pre-selected process includes: (1) computing first and second singular values from the rank-revealing domain, and (2) estimating a spectral ratio as a ratio of the first and second singular values. The method also includes (f) updating the seismic survey design based on which of the off-the-grid locations has the minimum rank. The method also includes (g) repeating steps (b)-(f) for a number of iterations until a pre-selected threshold is met indicating an optimal seismic survey design, where the number of iterations is driven by a simulated annealing process. The method also includes (h) acquiring seismic data using the optimal seismic survey design. The seismic data can be acquired from a regular or irregular grid with random time or space dithers, the regular or irregular grid having a seismic source. Multiple seismic sources are activated in activation patterns can be extended to more than two of the seismic sources, and the seismic sources can be deployed in a marine environment as single seismic sources or multiple seismic sources from single vessel- or multiple vessel-configurations for marine environments and used to acquire the seismic data. The multiple seismic sources can be deployed in a land environment. The rank minimization is constrained by ensuring that two of the seismic sources are not activated within a pre-selected distance from each other by using spatial location constraints. The optimal seismic survey design includes regular or irregular grid locations with time dithers using an optimization scheme for both of the seismic sources and seismic receivers in a pre-selected number of directions, the seismic receivers are deployed in water along towed streamers or within waterbottom nodes, or the seismic receivers are geophones deployed on land, or the seismic receivers are deployed in wells. The seismic data from the seismic receivers are obtained through distributed acoustic sensors using fiber optics cables, the seismic sources are activated together or separated in time along with random and/or periodic time dithers with respect to each other. The optimal seismic survey design enables acquiring simultaneous or sequential seismic data. The spatial or temporal constraints for a source activation process include a quiet time between the source activations, where the quiet time includes setting a cap on a minimum or maximum randomized time interval between consecutive shots. The seismic data includes measurements of any or all of pressure, particle velocity, displacement, or acceleration wavefields or any subset of these. The method also includes (j) enabling processing and displaying the seismic data from the seismic survey. The method also includes (k) enabling performing a wellsite action based at least on the seismic data.

Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 1A illustrates an example of a system that includes various management components to manage various aspects of a geologic environment, according to an embodiment.

FIGS. 4A and 4B are flowcharts illustrating a method in accordance with embodiments of the present disclosure for creating a seismic survey.

DETAILED DESCRIPTION

Figure 1B:
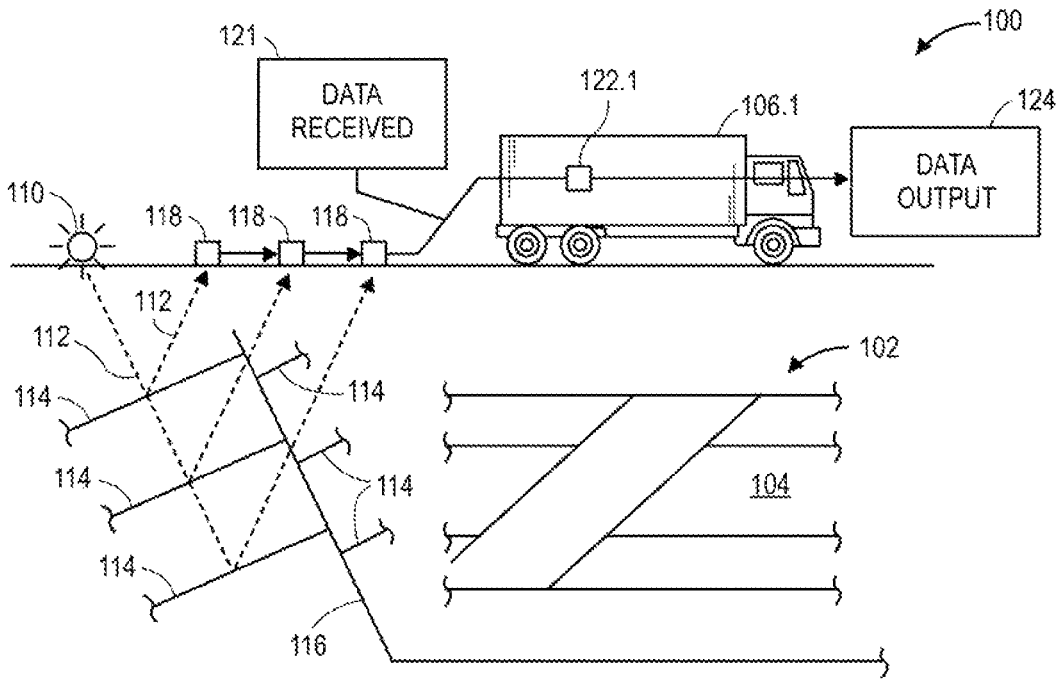
FIG. 1B illustrates a survey operation to measure properties of the subterranean formation.

In the following detailed description, numerous specific details are set forth in order to provide a thorough understanding of embodiments of the invention. However, it will be apparent to one of ordinary skill in the art that embodiments of the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of embodiments of the invention. The first object or step, and the second object or step, are both objects or steps, respectively, but they are not to be considered the same object or step.

The terminology used in the description herein is for the purpose of describing particular embodiments and is not intended to be limiting of the invention. As used in the description and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in response to detecting," depending on the context.

Those with skill in the art will appreciate that while some terms in this disclosure may refer to absolutes, e.g., all of the components of a wavefield, all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1A illustrates an example of a system 1100 that includes various management components 111 to manage various aspects of a geologic environment 150 (e.g., an environment that includes a sedimentary basin, a reservoir 151, one or more faults 153-1, one or more geobodies 153-2, etc.). For example, the management components 111 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 111).

In the example of FIG. 1A, the management components 111 include a seismic data component 113, an additional information component 115 (e.g., well/logging data), a processing component 117, a simulation component 120, an attribute component 130, an analysis/visualization component 142 and a workflow component 144. In operation, seismic data and other information provided per the components 113 and 115 may be input to the simulation component 120.

In an example embodiment, the simulation component 120 may rely on entities 122. Entities 122 may include earth entities or geological objects such as wells, surfaces, bodies, reservoirs, etc. In the system 1100, the entities 122 can include virtual representations of actual physical entities that are reconstructed for purposes of simulation. The entities 122 may include entities based on data acquired via sensing, observation, etc. (e.g., the seismic data 113 and other information 115). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® NET® framework (Redmond, Washington), which provides a set of extensible object classes. In the NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1A, the simulation component 120 may process information to conform to one or more attributes specified by the attribute component 130, which may include a library of attributes. Such processing may occur prior to input to the simulation component 120 (e.g., consider the processing component 117). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1A, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Texas), the INTERSECT® reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 111 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing asset team productivity, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 111 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1A also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1A, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1A, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1A, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156A and 156B may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1A shows a satellite in communication with the network 155 that may be configured for communications, noting that the satellite may additionally or instead include circuitry for imagery (e.g., spatial, spectral, temporal, radiometric, etc.).

FIG. 1A also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 1100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

FIGS. 1B-1E illustrate simplified, schematic views of oilfield 100 having subterranean formation 102 containing reservoir 104 therein in accordance with implementations of various technologies and techniques described herein.

FIG. 1B illustrates a survey operation being performed by a survey tool, such as seismic truck 106.1, to measure properties of the subterranean formation. The survey operation is a seismic survey operation for producing sound vibrations. In FIG. 1B, one such sound vibration, e.g., sound vibration 112 generated by source 110, reflects off horizons 114 in earth formation 116. A set of sound vibrations is received by sensors, such as geophone-receivers 118, situated on the earth's surface. The data received 121 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 1C:
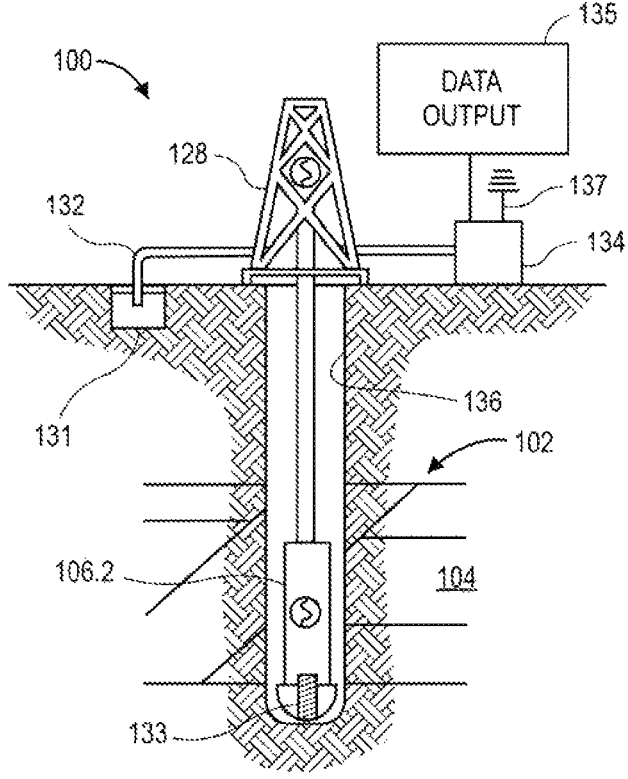
FIG. 1C illustrates a drilling operation to form a wellbore.

FIG. 1C illustrates a drilling operation being performed by drilling tools 106.2 suspended by rig 128 and advanced into subterranean formations 102 to form wellbore 136. Mud pit 131 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1D:
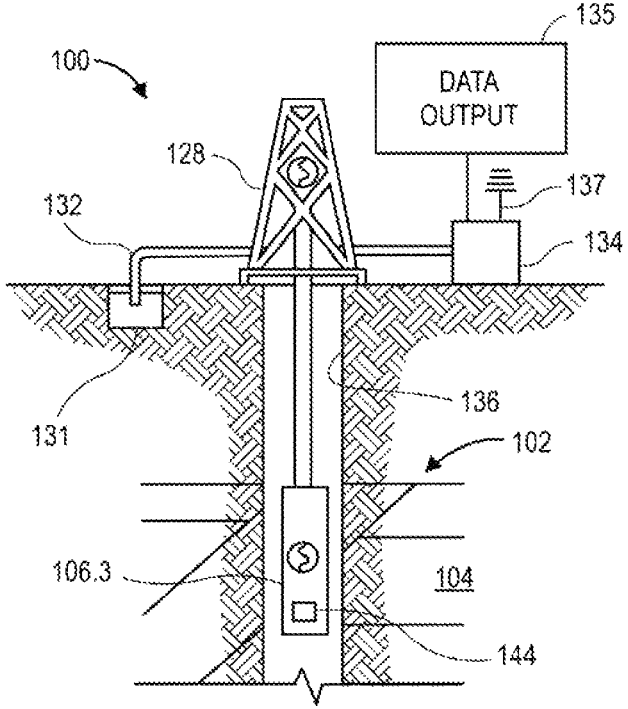
FIG. 1D illustrates a wireline operation into the wellbore of FIG. 1C.

FIG. 1D illustrates a wireline operation being performed by wireline tool 106.3 suspended by rig 128 and into wellbore 136 of FIG. 1C. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1B. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 1E:
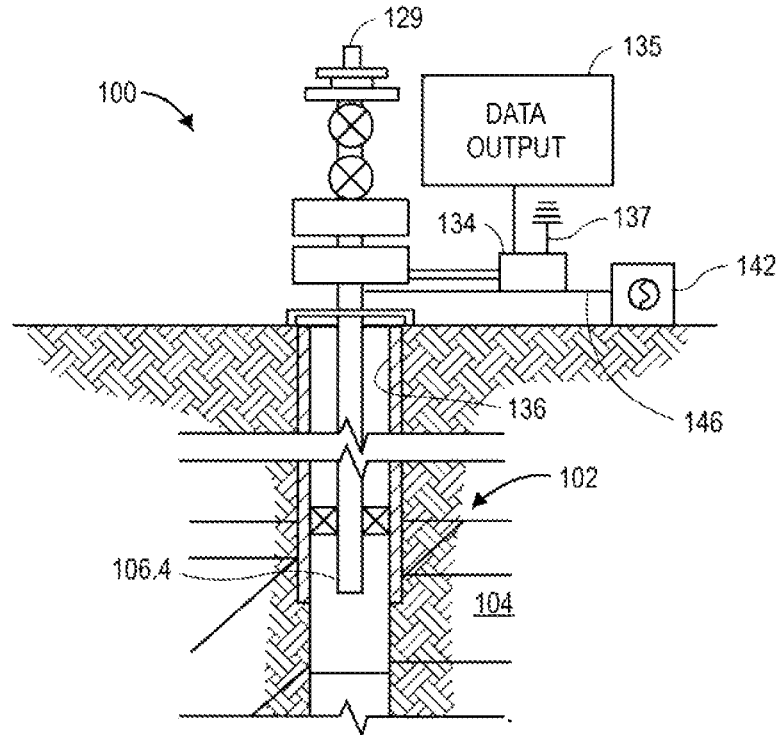
FIG. 1E illustrates a production operation for drawing fluid from the downhole reservoirs into surface facilities.

FIG. 1E illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1C-1E illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1B-1E are intended to provide a brief description of an example of a field usable with oilfield application frameworks. Part of, or the entirety, of oilfield 100 may be on land, water, and/or sea. Also, while a single field measured at a single location is depicted, oilfield applications may be utilized with any combination of one or more oilfields, one or more processing facilities and one or more wellsites.

Figure 1F:
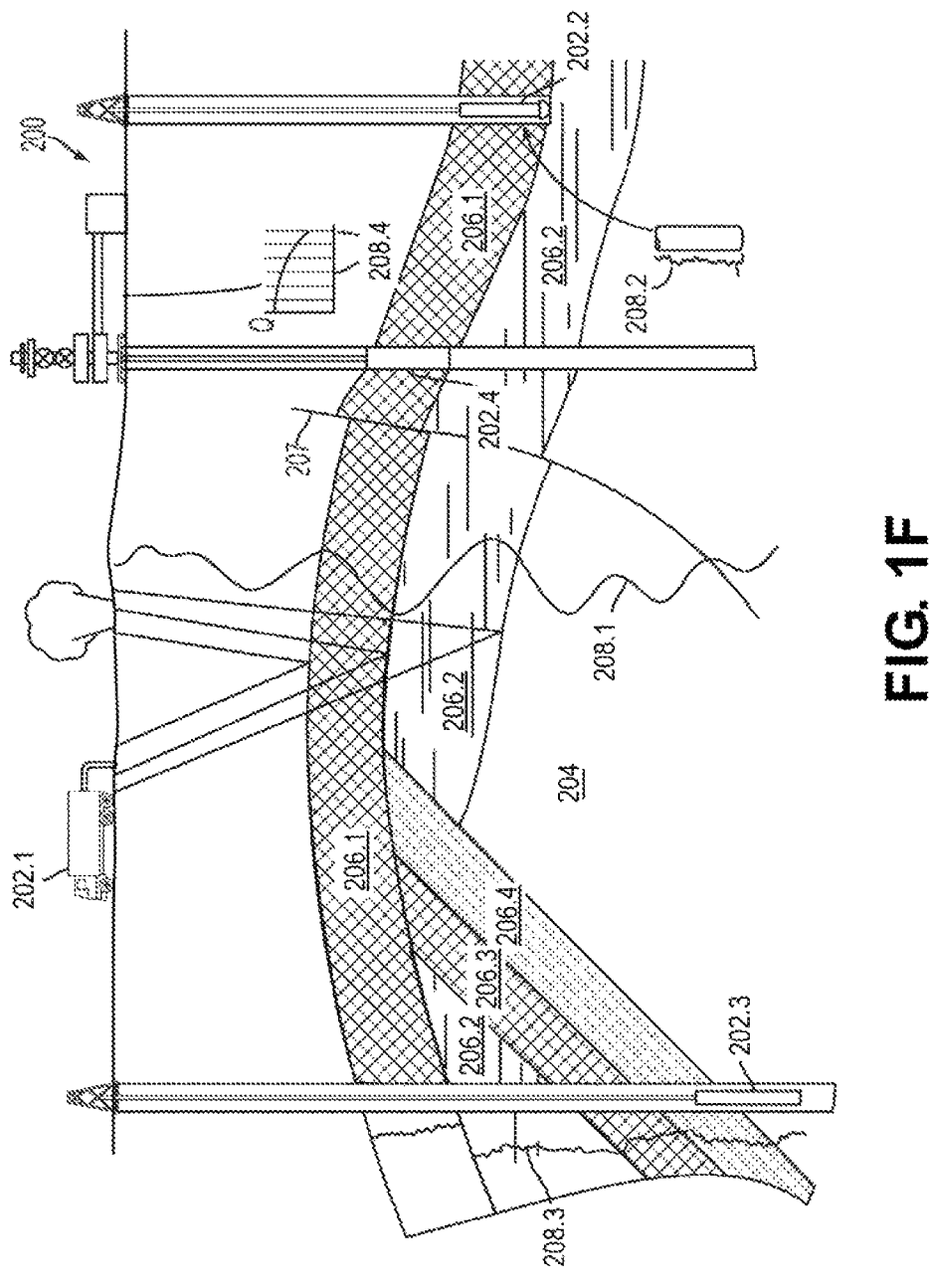
FIG. 1F illustrates a schematic view of an oilfield in accordance with implementations of various technologies and techniques described herein.

FIG. 1F illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1B-1E, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 1F, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 1G:
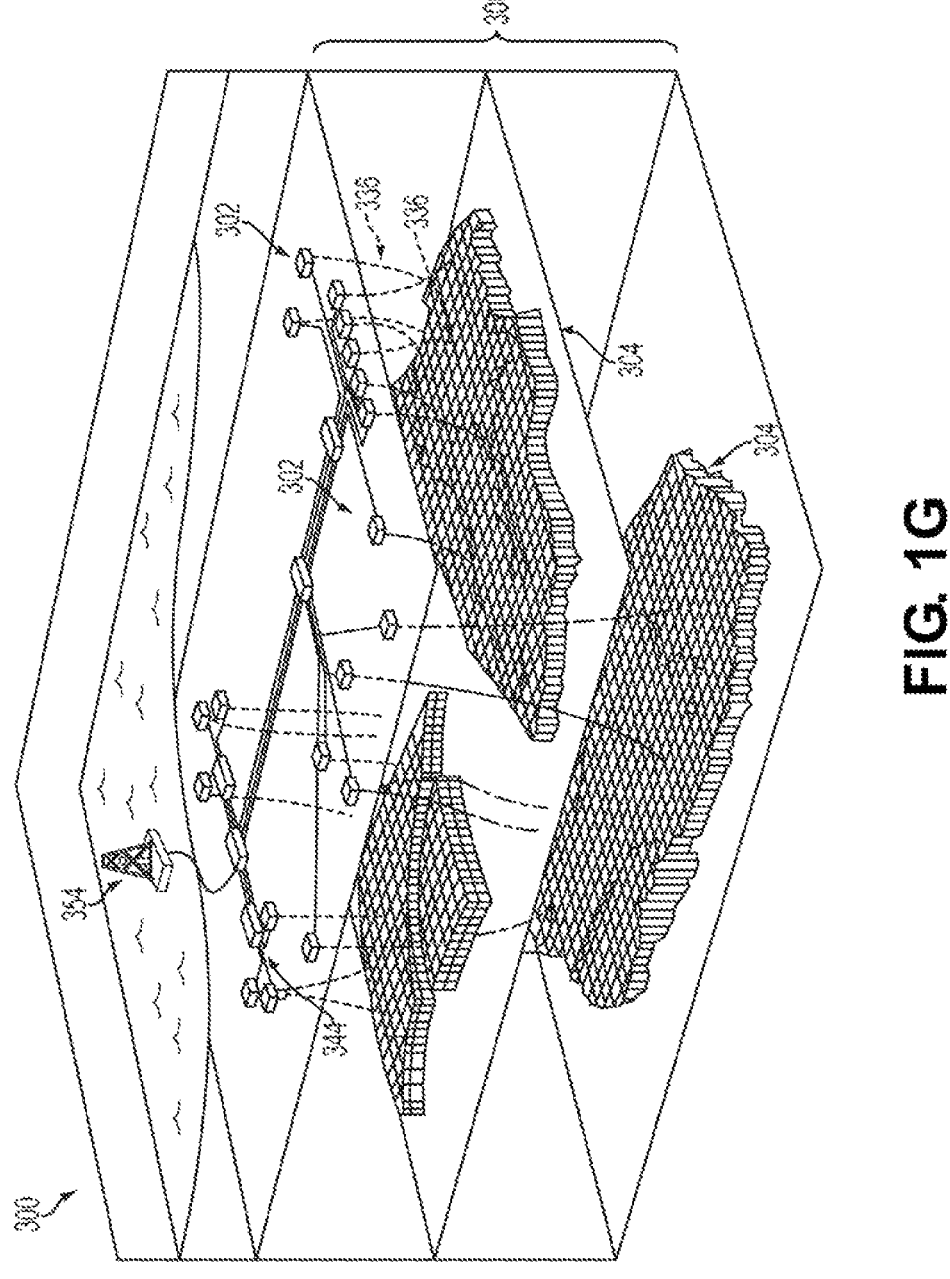
FIG. 1G illustrates an oilfield for performing production operations in accordance with implementations of various technologies and techniques described herein.

FIG. 1G illustrates an oilfield 300 for performing production operations in accordance with implementations of various technologies and techniques described herein. As shown, the oilfield has a plurality of wellsites 302 operatively connected to central processing facility 354. The oilfield configuration of FIG. 1G is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 1H:
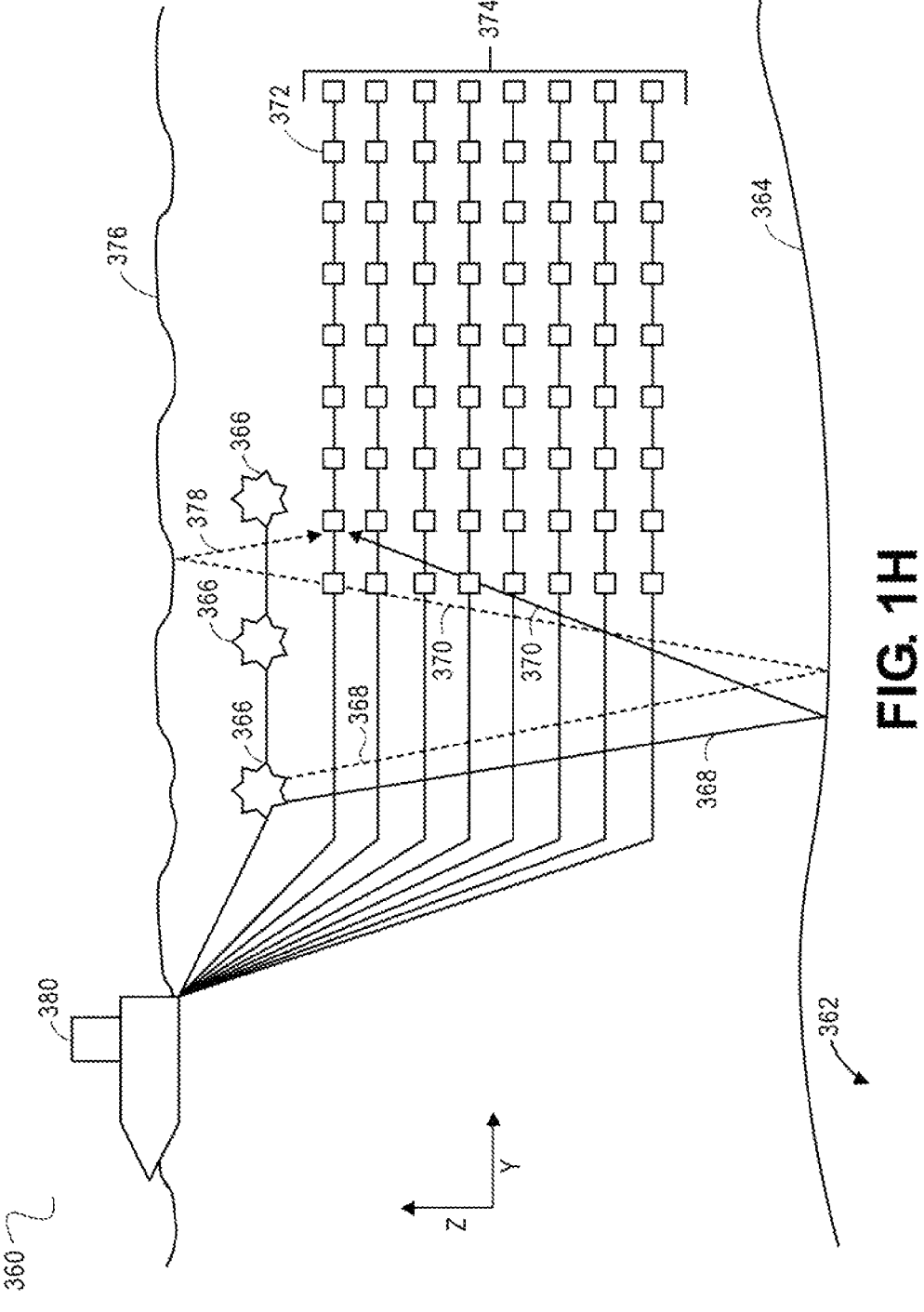
FIG. 1H illustrates a side view of a marine-based survey of a subterranean subsurface in accordance with one or more implementations of various techniques described herein.

Attention is now directed to FIG. 1H, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 1H illustrates eight streamers towed by vessel 380 at eight different depths. The depth of each streamer may be controlled and maintained using the birds disposed on each streamer.

Figure 1I:
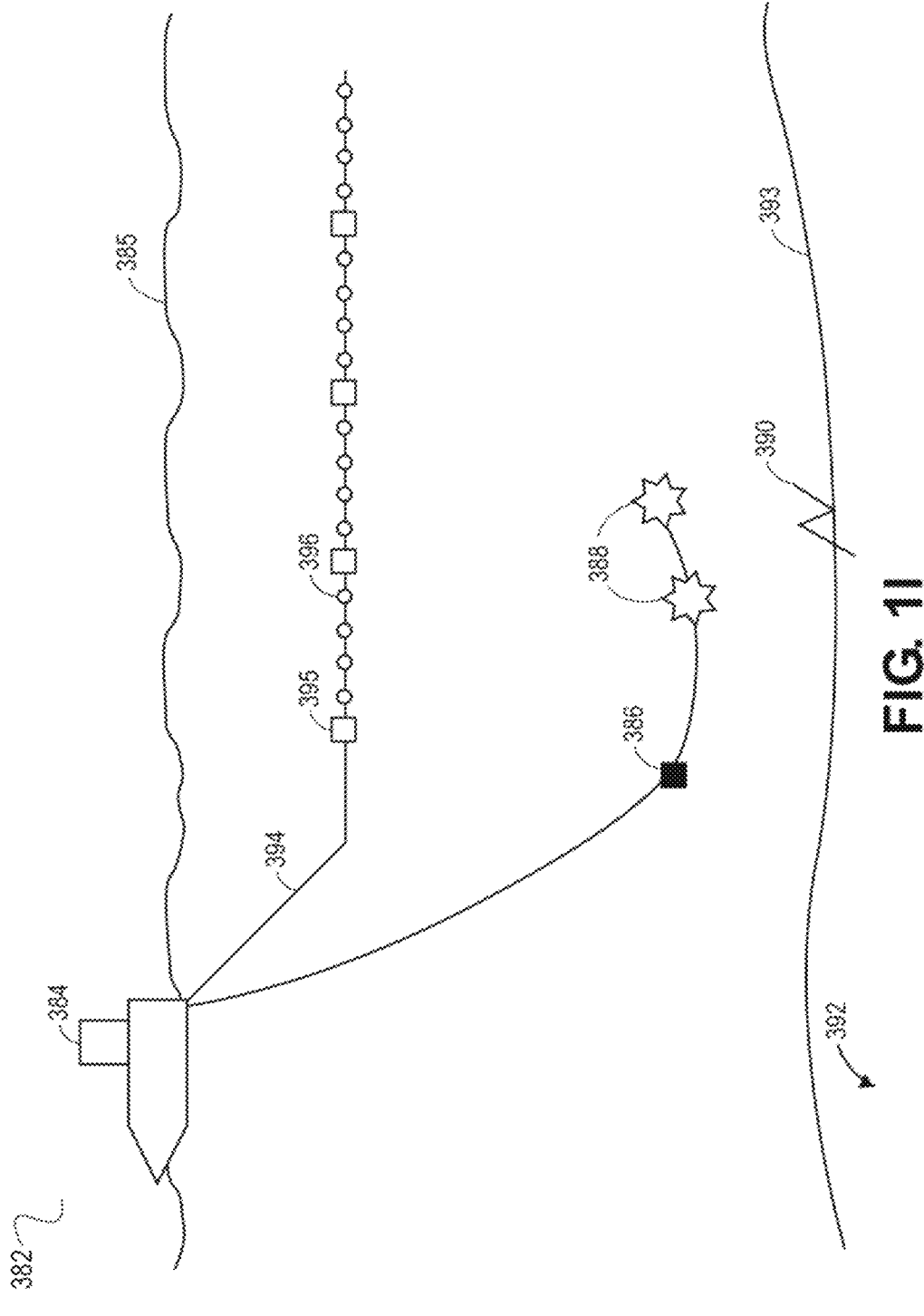
FIG. 1I illustrates a marine electromagnetic survey system in accordance with implementations of various technologies described herein.

Attention is now directed to FIG. 1I that depicts a marine electromagnetic survey system 382 in accordance with implementations of various technologies described herein. The electromagnetic survey system 382 may use controlled-source electromagnetic (CSEM) survey techniques, but other electromagnetic survey techniques may also be used. Marine electromagnetic surveying may be performed by a survey vessel 384 that moves in a predetermined pattern along the surface 385 of a body of water such as a lake or the ocean. The survey vessel 384 is configured to pull a towfish (an electric source) 386, which is connected to a pair of electrodes 388. During the survey, the vessel may stop and remain stationary for a period of time while obtaining measurements, while in some circumstances, the vessel may remain underway while obtaining measurements.

At the source 386, a controlled electric current may be generated and sent through the electrodes 388 into the seawater. For instance, the electric current generated may be in the range between about 0.01 Hz and about 20 Hz. The current creates an electromagnetic field 390 in the subsurface 392 to be surveyed below the sea floor 393. The electromagnetic field 390 may also be generated by magneto-telluric currents instead of the source 386. The survey vessel 384 may also be configured to tow a sensor cable 394. The sensor cable 394 may be a marine towed cable. The sensor cable 394 may contain sensor housings 395, telemetry units 396, and current sensor electrodes (not illustrated). The sensor housings 395 may contain voltage potential electrodes for measuring the electromagnetic field 390 strength created in the subsurface area 392 during the surveying period. The current sensor electrodes may be used to measure electric field strength in directions transverse to the direction of the sensor cable 394 (the y- and z-directions). The telemetry units 396 may contain circuitry configured to determine the electric field strength using the electric current measurements made by the current sensor electrodes. While a marine-based electromagnetic survey is described in regard to FIG. 1I, a land-based electromagnetic survey may also be used in accordance with implementations of various techniques described herein.

Figure 1J:
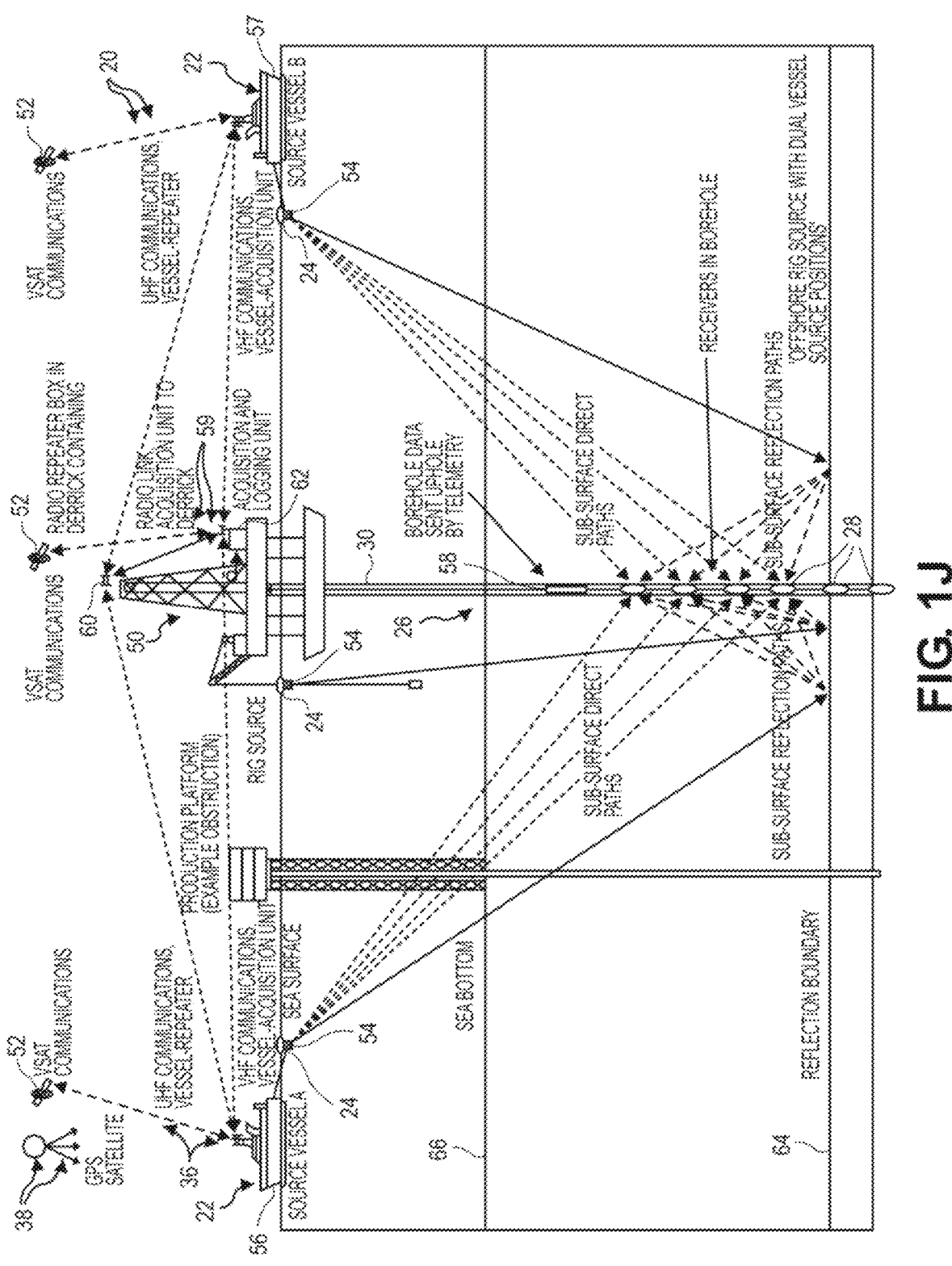
FIG. 1J illustrates an embodiment of a seismic system in which a plurality of tow vessels is employed to enable seismic profiling.

Attention is now directed to FIG. 1J that depicts an embodiment of seismic system 20 in which a plurality of tow vessels 22 is employed to enable seismic profiling, e.g. three-dimensional vertical seismic profiling or rig/offset vertical seismic profiling. In FIG. 1J, a marine system is illustrated as including a rig 50, a plurality of vessels 22, and one or more acoustic receivers 28. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two vessels 22 are illustrated in FIG. 1J, a single vessel 22 with multiple source arrays 24 or multiple vessels 22 each with single or multiple sources 24 may be used. In some applications, at least one source/source array 24 may be located on the rig 50 as represented by the rig source in FIG. 1J. As the vessels 22 travel on predetermined or systematic paths, their locations may be recorded through the use of navigation system 36. In some cases, the navigation system 36 utilizes a global positioning system (GPS) 38 to record the position, speed, direction, and other parameters of the tow vessels 22.

As illustrated, the global positioning system 38 may utilize or work in cooperation with satellites 52 which operate on a suitable communication protocol, e.g., VSAT communications. The VSAT communications may be used, among other things, to supplement VHF and UHF communications. The GPS information can be independent of the VSAT communications and may be input to processing system or other suitable processors to predict the future movement and position of the vessels 22 based on real-time information. In addition to predicting future movements, the processing system also can be utilized to provide directions and coordinates as well as to determine initial shot times, as described above. Control system effectively utilizes processing system in cooperation with source controller and synchronization unit to synchronize the sources 24 with the downhole data acquisition system 26.

As illustrated, the one or more vessels 22 each tow one or more acoustic sources/source arrays 24. The source arrays 24 include one or more seismic signal generators 54, e.g. air guns, configured to create a seismic/sonic disturbance. In the embodiment illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 1J) or at another suitable location, and both vessels 22 may serve as slave vessels with respect to the rig source 24 or with respect to a source at another location.

However, a variety of source arrangements and implementations may be provided as desired for a given application. When utilizing dithered timing between the sources, for example, the master and slave locations of the sources can be adjusted according to the parameters of the specific seismic profiling application. In some applications, one of the source vessels 22 (e.g., source vessel A in FIG. 1J) may serve as the master source vessel while the other source vessel 22 serves as the slave source vessel with dithered firing. However, an alternate source vessel 22 (e.g., source vessel B in FIG. 1J) may serve as the master source vessel while the other source vessel 22 serves as the slave source vessel with dithered firing.

Similarly, the rig source 24 may serve as the master source vessel while one of the source vessels 22 (e.g., vessel A) serves as the slave source vessel with dithered firing. The rig source 24 also may serve as the master source while the other source vessel 22 (e.g., vessel B) serves as the slave source vessel with dithered firing. In some applications, the rig source 24 may serve as the master source while both of the source vessels 22 serve as slave source vessels each with dithered firings. These and other arrangements may be used in achieving the desired synchronization of sources 24 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, the illustrated embodiment comprises a plurality of receivers 28 that may be located in a variety of positions and orientations. The acoustic receivers 28 may be configured for sonic and/or seismic reception. Additionally, the acoustic receivers 28 may be communicatively coupled with processing equipment 58 located downhole. By way of example, processing equipment 58 may comprise a telemetry system for transmitting data from acoustic receivers 28 to additional processing equipment 59 located at the surface, e.g., on the rig 50 and/or vessels 22.

Depending on the specifics of a given data communication system, examples of surface processing equipment 59 may comprise a radio repeater 60, an acquisition and logging unit 62, and a variety of other and/or additional signal transfer components and signal processing components. The radio repeater 60 along with other components of processing equipment 59 may be used to communicate signals, e.g., UHF and/or VHF signals, between vessels 22 and rig 50 and to enable further communication with downhole data acquisition system 26.

It should be noted the UHF and VHF signals can be used to supplement each other. In general, the UHF band supports a higher data rate throughput but can be susceptible to obstructions and has less range. The VHF band is less susceptible to obstructions and has increased radio range but its data rate throughput is lower. In FIG. 1J, for example, the VHF communications are illustrated as "punching through" an obstruction in the form of a production platform.

In some applications, the acoustic receivers 28 are coupled to surface processing equipment 59 via a hardwired connection. In other embodiments, wireless or optical connections may be employed. In still other embodiments, combinations of coupling techniques may be employed to relay information received downhole via the acoustic receivers 28 to an operator and/or control system, e.g., control system, located at least in part at the surface.

In addition to providing raw or processed data uphole to the surface, the coupling system, e.g., downhole processing equipment 58 and surface processing equipment 59, may be designed to transmit data or instructions downhole to the acoustic receivers 28. For example, the surface processing equipment 59 may comprise synchronization unit which coordinates the firing of sources 24, e.g., dithered (delayed) source arrays, with the acoustic receivers 28 located in borehole 30. According to one embodiment, the synchronization unit uses coordinated universal time to ensure accurate timing. In some cases, the coordinated universal time system is employed in cooperation with global positioning system 38 to obtain UTC data from the GPS receivers of GPS system 38.

FIG. 1J illustrates one example of a system for performing seismic profiling that can employ simultaneous or near-simultaneous acquisition of seismic data. By way of example, the seismic profiling may comprise three-dimensional vertical seismic profiling but other applications may utilize rig/offset vertical seismic profiling or seismic profiling employing walkaway lines. An offset source can be provided by a source 24 located on rig 50, on a stationary vessel 22, and/or on another stationary vessel or structure.

As an example, the overall seismic system 20 may employ various arrangements of sources 24 on vessels 22 and/or rig 50 with each location having at least one source/source array 24 to generate acoustic source signals. The acoustic receivers 28 of downhole acquisition system 26 are configured to receive the source signals, at least some of which are reflected off a reflection boundary 64 located beneath a sea bottom 66. The acoustic receivers 28 generate data streams that are relayed uphole to a suitable processing system, e.g., processing system, via downhole telemetry/processing equipment 58.

While the acoustic receivers 28 generate data streams, the navigation system 36 determines a real-time speed, position, and direction of each vessel 22 and also estimates initial shot times accomplished via signal generators 54 of the appropriate source arrays 24. The source controller may be part of surface processing equipment 59 (located on rig 50, on vessels 22, or at other suitable locations) and is designed to control firing of the acoustic source signals so that the timing of an additional shot time (e.g., a shot time via slave vessel 57) is based on the initial shot time (e.g., a shot time via master vessel 56) plus a dither value.

The synchronization unit of, for example, surface processing equipment 59, coordinates the firing of dithered acoustic signals with recording of acoustic signals by the downhole acquisition system 26. Processor system is configured to separate a data stream of the initial shot and a data stream of the additional shot via the coherency filter. As discussed above, however, other embodiments may employ pure simultaneous acquisition and/or may not perform separation of the data streams. In such cases, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns reduces the overall amount of time used for three-dimensional vertical seismic profiling source acquisition. This, in turn, reduces rig time. As a result, the overall cost of the seismic operation is reduced, rendering the data intensive process much more accessible.

If the acoustic source arrays used in the seismic data acquisition are widely separated, the difference in move-outs across the acoustic receiver array of the wave fields generated by the acoustic sources 24 can be sufficient to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Attention is now directed to methods, techniques, and workflows for processing and/or transforming collected data that are in accordance with some embodiments. Some operations in the processing procedures, methods, techniques, and workflows disclosed herein may be combined and/or the order of some operations may be changed. Those with skill in the art will recognize that in the geosciences and/or other multi-dimensional data processing disciplines, various interpretations, sets of assumptions, and/or domain models such as velocity models, subsurface models, simulation results, ensembles of simulation results, economic models, uncertainty estimates, and the like, may be refined in an iterative fashion; this concept is applicable to the procedures, methods, techniques, and workflows as discussed herein. This iterative refinement can include use of feedback loops executed on an algorithmic basis, such as at a computing device (e.g., computing system 1100, FIG. 1A), and/or through manual control by a user who may make determinations regarding whether a given step, action, template, or model has become sufficiently accurate.

Seismic data acquired during land and/or marine environment is expensive in nature. Thus, producing a less expensive survey design is always a necessity. Moreover, due to environmental constraints, it is desired to maintain a separation between subsequent sources while acquiring data in inline or crossline directions. Simultaneous-source acquisition (SSA) can be used to acquire ultra-long offset data (~40-60 kilometer (km)) with ocean-bottom nodal (OBN). Sparse OBN data are acquired by surveys that use a grid of sparse nodes (in the range of, for example, but not limited to, ~400-1000 meter (m) separation) and dense shots (for example, but not limited to, a 100×50 m grid). Although the simultaneous-source design can reduce the cost of surveys, separation of the signals from the different sources, also known as deblending, whose success relies on the randomization of interference noise (also known as blending noise) in the time-space domain can be necessary. The robustness of source separation can rely on the differentiation of a coherent signal from the interference noise in a sparsity or low-rank promoting transform domain. This differentiation can be controlled by the survey design, which can be sub-optimal. For example, different sources can either generate strong interference noise overlying the strong coherent signal, termed a strong-over-strong phenomenon, or strong interference noise on the weak coherent signal, termed a strong-over-weak phenomenon. Optimizing the survey design to increase the randomization in interference noise can enable source separation.

Producing an optimal survey design for simultaneous source acquisition can exploit the fact that dense seismic data exhibit sparse or low-rank structures in a transform domain. Subsampling underlying dense data, depending upon the sub-sampling pattern, data should exhibit less sparse or high-rank structure in the transform domain. From a sampling perspective, this translates to improving the connectivity of edges of a bipartite graph. Thus, a large spectral gap (i.e., the gap between the first and the second singular value), guarantees the optimal signal recovery using sparsity or rank-minimization-based techniques under certain incoherence properties. Hence, an optimization strategy to minimize the spectral gap can generate optimal off-the-grid sources-receivers' locations for seismic surveys.

To optimize the randomization along both inline and crossline directions following the principle of compressive sensing, a rank-minimization based optimization strategy for survey design can be used to evaluate the optimal source-receiver layout. An optimal survey design exhibits small spectral ratio (SR), which is the ratio of the first to second singular values. As the ratio becomes smaller, the underlying design has larger spectral gap, which means that the underlying sampling design exhibits maximum randomization in the transform domain. Given $n_s \in n_{sx} \times n_{sy}$ source locations, $n_r \in n_{rx} \times n_{ry}$ receiver locations along $x$ and $y$-directions, respectively, and the underlying subsampling ratio $r$ for sources and receivers, the following non-convex combinatorial optimization problem for off-the-grid subsampling mask $M \in \{0,1\}^{n_s n_r}$ can be solved:

$$\varphi(M) = \underset{M}{\text{minimize}} \; \frac{\sigma_2(\boldsymbol{\mathcal{T}} \boldsymbol{\mathcal{N}}' M)}{\sigma_1(\boldsymbol{\mathcal{T}} \boldsymbol{\mathcal{N}}' M)}$$

subject to $$\|M\|_0 = \lfloor n_s \times r \rfloor \times \lfloor n_r \times r \rfloor \cap M \in \tag{1}$$

$$(\boldsymbol{\mathcal{J}} + \boldsymbol{\mathcal{D}} \in \{-x_a, x_a\}^{n_s n_r} + \boldsymbol{\mathcal{E}} \in \{-x_b, x_b\}^{n_s n_r}) \cap M \in \{0, 1\}^{n_s \times n_r}.$$

In equation (1), $\sigma$ represents the singular value of the underlying mask $M$ in the transform domain ($\boldsymbol{\mathcal{T}}$) where the data exhibit sparse or low-rank structure. $\boldsymbol{\mathcal{N}} \in \mathbb{C}^{n_{sx} n_{sy} n_{rx} n_{ry} \times n_{sub}}$ represents a multidimensional off-the-grid Fourier transform which maps data from an unstructured subsampling grid to dense periodic grid. The off-the-grid Fourier transform is used because the spectral ratio of the underlying grid does not change if evaluated in physical domain or Fourier domain, as the Fourier transform conserves energy and is orthogonal in nature. Constraints are imposed while solving equation (1) to find optimal unstructured grid locations. One constraint is that $\lfloor n_s \times r \rfloor \lfloor n_r \times r \rfloor$ imposes the fact that the outcome of the optimization problem should maintain a desired value for the subsampling ratio $r$, where $\lfloor \dots \rfloor$ denotes a rounding operation. Other constraints can include spatial sampling constraints such as, for example, but not limited to, (i) jittered sampling which is defined to control the gap size between the source-receiver locations during the survey designing process; (ii) random dither spatial location $\boldsymbol{\mathcal{D}}$ to incorporate off-the-grid randomness within $\pm x_a$ spatial distance from the underlying periodic grid; (iii) spatial location constraints that ensure that two sources in the field never get activated with spatial distance $x_b$, which can be, but are not limited to being, user-defined. Another constraint ensures that the underlying mask is a binary mask with a value of either 0 or 1 at each of the survey locations. Optimal survey design lies in the intersection of the constraints. Although equation (1) optimizes the survey design on spatial location, given a vehicle speed, the same parameters can be optimized over acquisition time also. One purpose of jittered under-sampling is to periodically decimate the interpolation grid followed by perturbing the coarse-grid sample points on the fine grid for interpolation. Heuristic methods can be used to solve Equation (1). For example, simulating annealing (SA), which can approximate the global optimum of a combinatorial optimization problem within a computational budget using probabilistic techniques, can be used, or methods such as particle swarm optimization, variable neighborhood search, constraint satisfaction problem, greedy algorithms or integer linear programming.

---

Technique 1: Simulating annealing for off-the-grid survey design

Inputs:
$M_o$: initial periodic sampling locations
J: maximum number of iterations, i.e., $J = 1 \dots j$
$x_a$, $x_b$: spatial or temporal constraints to generate off-the-grid location
$T_j$: Temperature function
$\boldsymbol{\mathcal{N}}$: multidimensional off-the-grid Fourier operator
$\boldsymbol{\mathcal{T}}$: transform-domain where spectral ratio is computed $p$: probability function, i.e., $p(\delta\varphi, j) = \exp\left(\dfrac{\delta\varphi}{T_j}\right)$, $\delta\varphi = \varphi_{k+1}(M) - \varphi_k(M)$ Begin SA loop For $J = 0$ to j
   $T_j = T_0 \times \alpha^j$
   $M_j$: randomly pick on-the-grid neighboring locations and add $\boldsymbol{\mathcal{D}}$, $\boldsymbol{\mathcal{E}}$ to generate new off-the grid locations
    apply multidimensional off - the - grid Fourier transform
   ($\boldsymbol{\mathcal{N}}$) to map sampling grid from physical domain to wavenumber domain
    map the wavenumber domain to rank-revealing transform domain using $\boldsymbol{\mathcal{T}}$ compute the first and second singular values to estimate the spectral ratio $\delta\varphi = \varphi_{j+1} - \varphi_j$
   if $\delta\varphi < 0$, $M_{j+1} = M_j$ else, $M_{j+1} = \begin{cases} M_{j+1} \text{ with probability } p(\delta\varphi, j) \\ \qquad M_j \end{cases}$ end if
end for
Output: optimal survey design M with smallest spectral ratio

---

Figures 2A, 2B, 2C, 2D:
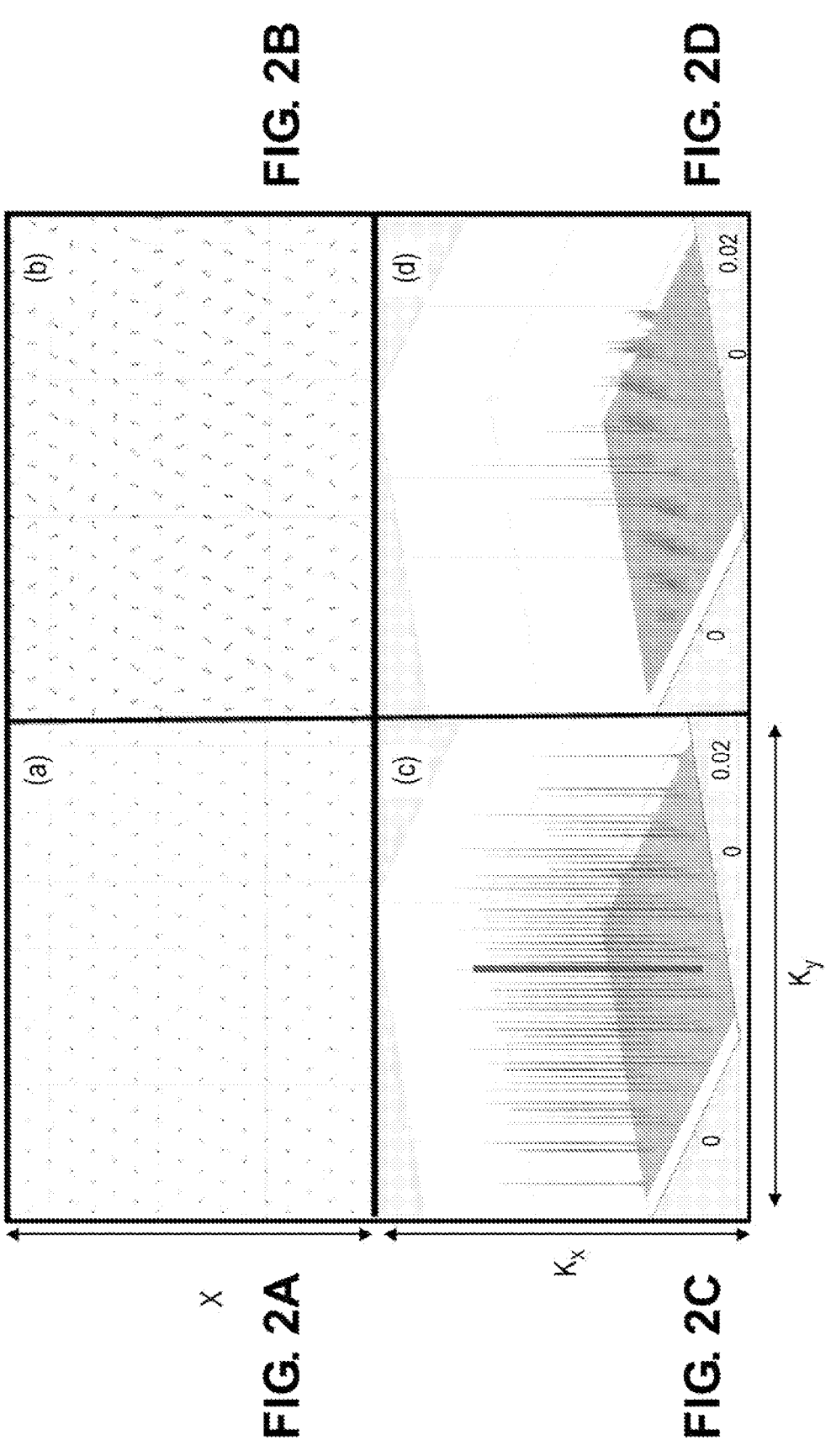
FIG. 2A illustrates periodic source locations of a conventional survey.
FIG. 2B illustrates optimized source locations determined by embodiments of methods according to the present disclosure.
FIGS. 2C and 2D illustrate a point spread function in the Fourier-wavenumber domain for the survey designs shown in FIGS. 2A and 2B respectively.

Referring now to FIGS. 2A-2D, an exemplary off-the-grid survey design for seismic data was created automatically using a method in accordance with embodiments of the present disclosure for deep-water (500-1700 m), ultra-long-offset (~40-60 km) OBN surveys for the Gulf of Mexico. The exemplary survey includes two vessels acquiring data, with three sources on each vessel. In the example, sampling nodes are positioned in a 1000 m×1000 m grid, with 50 m×100 m sampling steps. The three exemplary sources on each vessel fire approximately every 16.66 m in a flip-flop-flap manner with ±1 second(s) of time dither. In this exemplary survey, a 2 km distance is maintained between vessels, and a constant time delay of ±500 milliseconds (ms) is applied between surveys to ensure that two sources do not get activated simultaneously. FIG. 2A illustrates periodic source locations while FIG. 2B illustrates optimized source locations determined by embodiments of methods according to the present disclosure. Although the location of sources in both FIGS. 2A and 2B looks similar, producing the optimal source location with the lowest spectral ratio makes a drastic difference in how the interference energy appears over the coherent signal of interest (FIGS. 3A, 3B, 3D, and 3E). The interference energy using techniques described herein becomes highly randomized and no longer localized in the temporal-spatial window. Therefore, it increases the chances of producing an optimal source separation result. FIGS. 2C and 2D illustrate a point spread function in the Fourier-wavenumber domain for the survey designs shown in FIGS. 2A and 2B respectively. The darkened central line in FIG. 2C represents the location of a true signal in the Fourier-wavenumber domain.

Figures 3A, 3B, 3C, 3D, 3E, 3F, 3G, 3H, 3I:
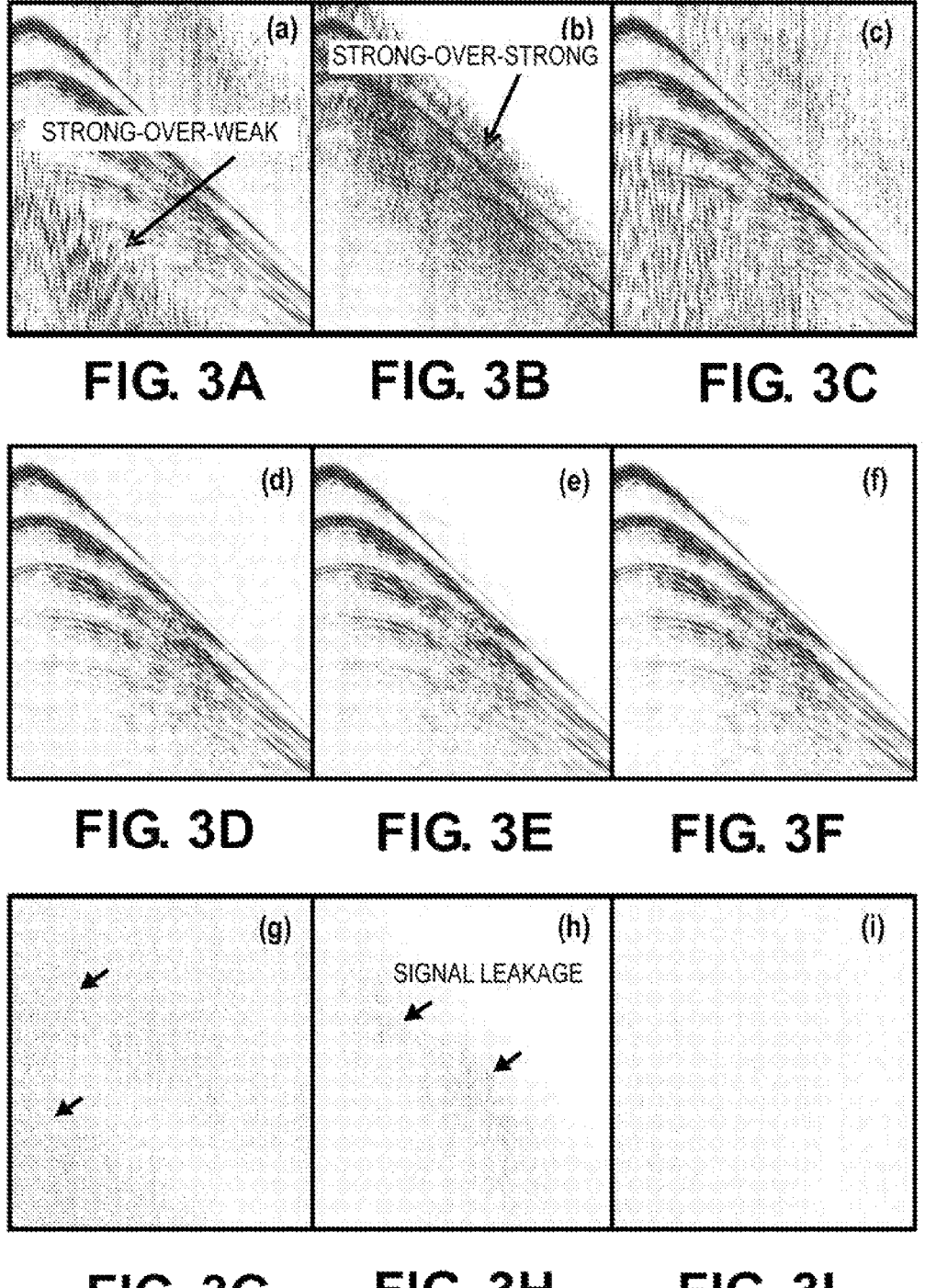
FIGS. 3A-3C illustrate blended source input.
FIGS. 3D-3F illustrate source separated signals.
FIGS. 3G and 3H illustrate the difference between ground truth and the source separated signals using a standard survey design such as illustrated in FIG. 2A.
FIG. 3I illustrates the difference between ground truth and the source separated signal using the survey designed as shown in FIG. 2B created in accordance with embodiments of the present disclosure.

Referring now to FIGS. 3A-3I, illustrated is a survey design evaluation of the survey design illustrated in FIG. 2A-2B. FIGS. 3A-3C illustrate blended source input, while FIGS. 3D-3F illustrate source separated signals. FIGS. 3G and 3H illustrate the difference between ground truth and the source separated signals using a standard survey design such as illustrated in FIG. 2A, while FIG. 3I illustrates the difference between ground truth and the source separated signal using the survey designed as shown in FIG. 2B created in accordance with embodiments of the present disclosure. As evident from FIGS. 3A and 3B, the conventional shooting pattern produces either strong-over-weak or strong-over-strong patterns from the same and/or different vessels. Both patterns put strong interference noise in a compressed hyperbolic region, thus reducing the randomization needed during the simultaneous source acquisition to obtain an optimal source separation.

Figure 4B:
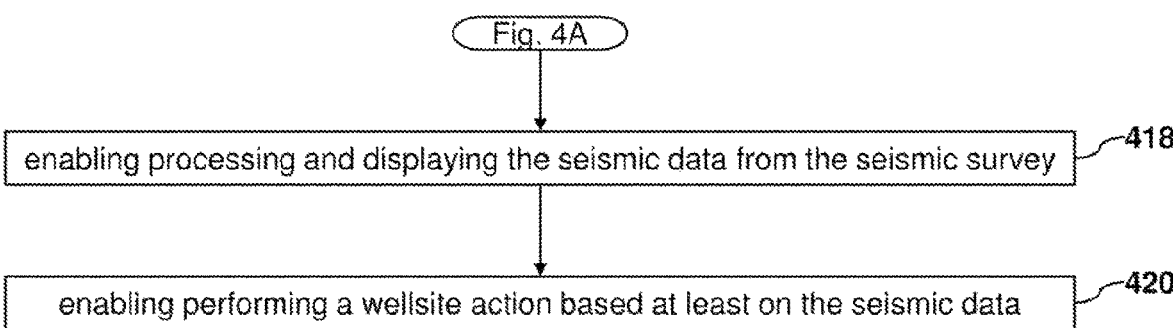

FIGS. 4A and 4B are flowcharts of the steps involved in creating a survey design in accordance with the present disclosure. The method 400 for designing a seismic survey, includes, but is not limited to including, selecting 402 (FIG. 4A) a seismic survey grid as a basis for a seismic survey design, generating 404 (FIG. 4A) off-the-grid locations by imposing spatial or temporal constraints on on-the-grid locations, and mapping 406 (FIG. 4A) the off-the-grid locations from a physical domain to a pre-selected domain by applying a multidimensional transform to the off-the-grid locations. The method 400 includes mapping 408 (FIG. 4A) the pre-selected domain to a rank-revealing domain using a pre-selected operator, applying 410 (FIG. 4A) a pre-selected process to minimize a rank of the off-the-grid locations in the pre-selected domain, and updating 412 (FIG. 4A) the seismic survey design based on which of the off-the-grid locations has the minimum rank. The method 400 includes optionally repeating steps 402-412 (FIG. 4A) for a number of iterations until a pre-selected threshold is met indicating an optimal seismic survey design (414). The method 400 includes acquiring 416 (FIG. 4A) seismic data using the optimal seismic survey design, enabling processing 418 (FIG. 4B) and displaying the seismic data from the seismic survey, and enabling performing 420 (FIG. 4B) a wellsite action based at least on the seismic data.

In some embodiments, a spectral gap based global optimization framework is used which produces off-the-grid source-receiver locations with the smallest spectral gap, e.g., a survey design creating highly randomized interference noise when performing simultaneous source acquisition using the optimal design. Such embodiments enable an optimal survey design. This design enables clients to acquire simultaneous source data where interference from other sources will be highly randomized; thus, source separated data are more robust compared to the data acquired with existing designs.

The wellsite action may be or include generating and/or transmitting a signal (e.g., using a computing system) that causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

These modules, combinations of these modules, and/or their combination with general hardware are included within the scope of protection.

Figure 5:
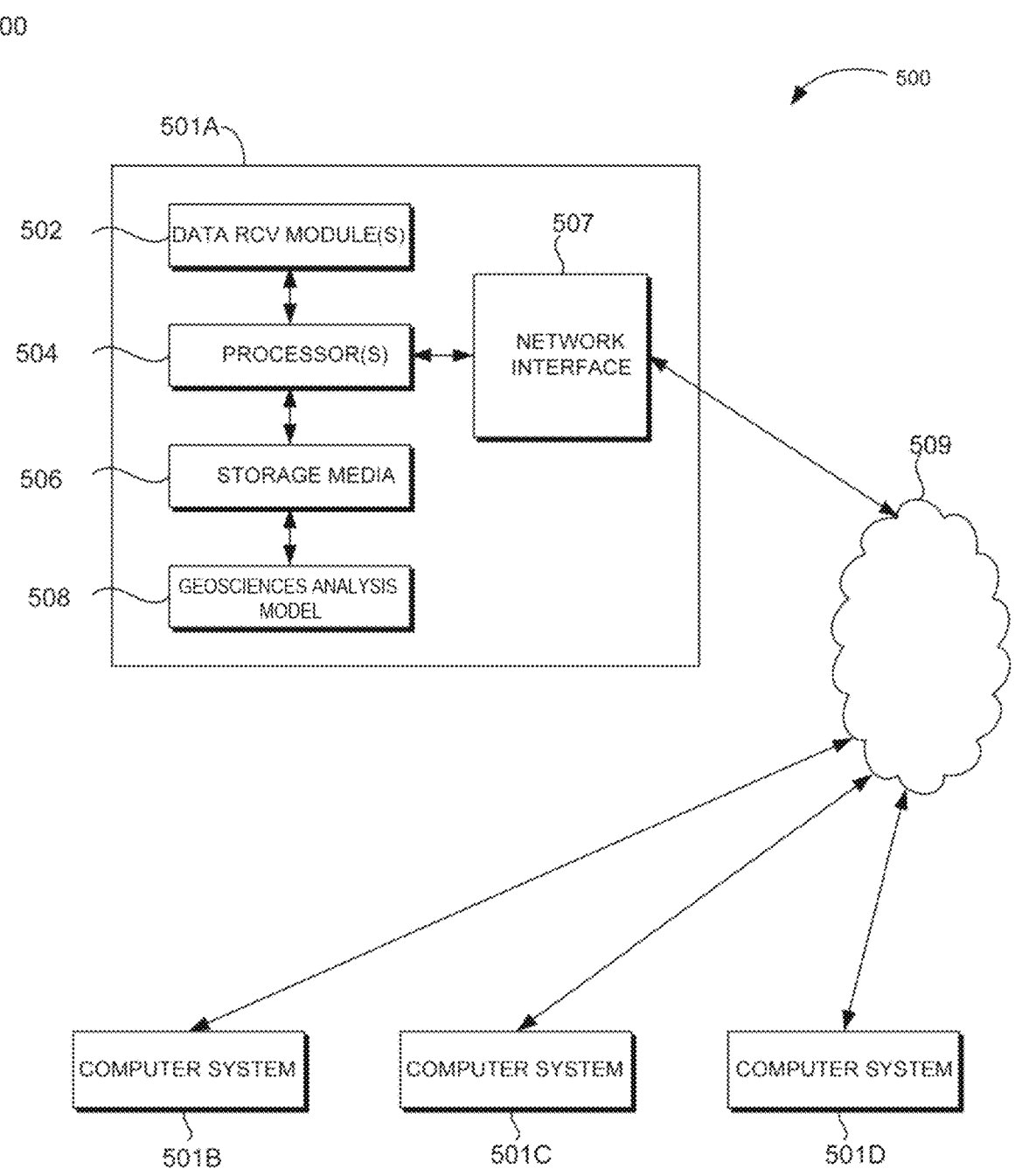
FIG. 5 illustrates a schematic view of a computing system, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more data reception and processing modules 502 that are configured to perform various tasks according to some embodiments, such as one or more methods disclosed herein. To perform these various tasks, the data reception and processing module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, for example, but not limited to, on a ship underway on the ocean, while in communication with one or more computer systems such as 501C and/or 501D that are located in one or more data centers, and/or located in varying countries on different continents). Note that data network 509 may be a private network, it may use portions of public networks, it may include remote storage and/or applications processing capabilities (e.g., cloud computing).

A processor 504 may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more geosciences analysis module(s) 508. In the example of computing system 500, computer system 501A includes the geosciences analysis module 508. In some embodiments, a single subsurface operations module may be used to perform some aspects of one or more embodiments of the methods disclosed herein. In other embodiments, a plurality of subsurface operations modules may be used to perform some aspects of methods herein. The computer system 501A includes one or more geosciences analysis modules 508 that are configured to perform various tasks according to some embodiments, such as one or more methods disclosed herein. To perform these various tasks, geosciences analysis module 508 executes independently, or in coordination with, one or more processors 504, which is (or are) connected to one or more storage media 506.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

Of course, many processing techniques for collected data, including one or more of the techniques and methods disclosed herein, may also be used successfully with collected data types other than seismic or other subsurface modeling data. While certain implementations have been disclosed in the context of seismic or other subsurface data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MRI and the like for human tissue; radar, sonar, and LIDAR imaging techniques; mining area surveying and monitoring, oceanographic surveying and monitoring, and other appropriate multi-dimensional imaging problems.

Some examples of equations and mathematical expressions may have been provided in this disclosure. But those with skill in the art will appreciate that variations of these expressions and equations, alternative forms of these expressions and equations, and related expressions and equations that can be derived from the example equations and expressions provided herein may also be successfully used to perform the methods, techniques, and workflows related to the embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for designing a seismic survey, the method comprising:
    (a) selecting a seismic survey grid as a basis for a seismic survey design;
    (b) generating off-the-grid locations by imposing spatial or temporal constraints on on-the-grid locations;
    (c) mapping the off-the-grid locations from a physical domain to a pre-selected domain by applying a multi-dimensional transform to the off-the-grid locations;
    (d) mapping the pre-selected domain to a rank-revealing domain using a pre-selected operator;
    (e) applying a pre-selected process to minimize a rank of the off-the-grid locations in the pre-selected domain;
    (f) updating the seismic survey design based on which of the off-the-grid locations has the minimum rank;
    (g) repeating steps (b)-(f) for a number of iterations until a pre-selected threshold is met indicating an optimal seismic survey design;
    (h) generating survey control data, utilizing the optimal seismic survey design, that specifies off-the-grid source-receiver locations and initial shot times for a seismic survey acquisition system;
    (i) transmitting the survey control data to a control system that utilizes a processing system in cooperation with a source controller and a synchronization unit to synchronize seismic sources with a data acquisition system to implement the off-the-grid source-receiver locations and initial shot times;
    (j) constraining the minimizing of the rank of the off-the-grid locations by ensuring that no two of the seismic sources are activated within a pre-selected distance from each other by using spatial location constraints;
    (k) acquiring seismic data using the optimal seismic survey design; and
    (l) displaying the seismic data from the seismic survey.

2. The method of claim 1, wherein the spatial or temporal constraints include a range of pre-selected offsets from the on-the-grid locations, the off-the-grid locations being configured to collect ocean-bottom nodal (OBN) sparse data.

3. The method of claim 1, wherein;
the pre-selected domain is a wavenumber domain or a sparsity promoting domain; and
the multidimensional transform is a Fourier transform when the pre-selected domain is the wavenumber domain.

4. The method of claim 1, wherein the pre-selected process comprises:
(1) computing first and second singular values from the rank-revealing domain; and
(2) estimating a spectral ratio as a ratio of the first and second singular values.

5. The method of claim 1, wherein the number of iterations is based on a heuristic process.

6. The method of claim 1, wherein the seismic data is acquired from a regular or irregular grid with random time or space dithers, the regular or irregular grid having a corresponding seismic source.

7. The method of claim 1, wherein the seismic sources are activated in activation patterns that are extended to more than two of the seismic sources.

8. The method of claim 1, wherein the seismic sources are deployed in a marine environment as single seismic sources or as a plurality of seismic sources from single vessel- or multiple vessel-configurations for marine environments and used to acquire the seismic data.

9. The method of claim 1, wherein a plurality of the seismic sources are deployed in a land environment.

10. The method of claim 1, wherein the optimal seismic survey design includes regular or irregular grid locations with time dithers using an optimization scheme for both the seismic sources and seismic receivers in a pre-selected number of directions.

11. The method of claim 1, wherein;
seismic receivers are deployed in water along towed streamers or within waterbottom nodes;
the seismic receivers are geophones deployed on land; or
the seismic receivers are deployed in wells.

12. The method of claim 1, wherein the seismic data from seismic receivers are obtained through distributed acoustic sensors using fiber optics cables.

13. The method of claim 1, wherein the seismic sources are activated together or separated in time along with one or more of random or periodic time dithers with respect to each other.

14. The method of claim 1, wherein the optimal seismic survey design enables acquiring simultaneous or sequential seismic data.

15. The method of claim 1, wherein:
the spatial or temporal constraints for a source activation process include a quiet time between seismic source activations; and
the quiet time includes setting a cap on a minimum or maximum randomized time interval between consecutive shots.

16. The method of claim 1, wherein the seismic data includes measurements of one or more of: pressure, particle velocity, displacement, or acceleration wavefields or any subset of these.

17. A computing system comprising at least one processor, at least one memory, and one or more programs stored in the at least one memory, the programs comprising instructions, which, when executed by the at least one processor, are configured to perform a method comprising:
(a) selecting a seismic survey grid as a basis for a seismic survey design;

(b) generating off-the-grid locations by imposing spatial or temporal constraints on on-the-grid locations;
(c) mapping the off-the-grid locations from a physical domain to a pre-selected domain by applying a multidimensional transform to the off-the-grid locations;
(d) mapping the pre-selected domain to a rank-revealing domain using a pre-selected operator;
(e) applying a pre-selected process to minimize a rank of the off-the-grid locations in the pre-selected domain;
(f) updating the seismic survey design based on which of the off-the-grid locations has the minimum rank;
(g) repeating steps (b)-(f) for a number of iterations until a pre-selected threshold is met indicating an optimal seismic survey design;
(h) generating survey control data, utilizing the optimal seismic survey design, that specifies off-the-grid source-receiver locations and initial shot times for a seismic survey acquisition system;
(i) transmitting the survey control data to a control system that utilizes a processing system in cooperation with a source controller and a synchronization unit to synchronize seismic sources with a data acquisition system to implement the off-the-grid source-receiver locations and initial shot times;
(j) constraining the minimizing of the rank of the off-the-grid locations by ensuring that no two of the seismic sources are activated within a pre-selected distance from each other by using spatial location constraints;
(k) acquiring seismic data using the optimal seismic survey design;
(l) displaying the seismic data from the seismic survey; and
(m) generating or transmitting a signal that causes a wellsite action to be performed based at least on the seismic data.

18. The computing system of claim 17, wherein:
the pre-selected domain is a wavenumber domain or a sparsity promoting domain; and
the multidimensional transform is a Fourier transform when the pre-selected domain is the wavenumber domain.

19. A non-transitory computer-readable storage medium, which has stored therein one or more programs, the one or more programs comprising instructions for designing a seismic survey, the instructions comprising:
(a) selecting a seismic survey grid as a basis for a seismic survey design;
(b) generating off-the-grid locations by imposing spatial or temporal constraints on on-the-grid locations, the spatial or temporal constraints comprising a range of pre-selected offsets from the on-the-grid locations, the off-the-grid locations being configured to collect ocean-bottom nodal (OBN) sparse data;
(c) mapping the off-the-grid locations from a physical domain to a pre-selected domain by applying a multidimensional transform to the off-the-grid locations, the pre-selected domain being a wavenumber domain or a sparsity promoting domain, the multidimensional transform being a Fourier transform when the pre-selected domain is the wavenumber domain;
(d) mapping the pre-selected domain to a rank-revealing domain using a pre-selected operator;
(e) applying a pre-selected process to minimize a rank of the off-the-grid locations in the pre-selected domain, the pre-selected process comprising:
(1) computing first and second singular values from the rank-revealing domain; and (2) estimating a spectral ratio as a ratio of the first and second singular values;

(f) updating the seismic survey design based on which of the off-the-grid locations has the minimum rank;

(g) repeating steps (b)-(f) for a number of iterations until a pre-selected threshold is met indicating an optimal seismic survey design, the number of iterations being based on a heuristic process;

(h) acquiring seismic data using the optimal seismic survey design, wherein:

the seismic data is acquired from a regular or irregular grid with random time or space dithers, the regular or irregular grid having a corresponding seismic source, multiple seismic sources are activated in activation patterns that are extended to more than two of the seismic sources, the seismic sources are deployed in a marine environment as single seismic sources or as a plurality of seismic sources from single vessel- or multiple vessel-configurations for marine environments and used to acquire the seismic data, the rank minimization is constrained by ensuring that no two of the seismic sources are activated within a pre-selected distance from each other by using spatial location constraints, the optimal seismic survey design includes regular or irregular grid locations with time dithers using an optimization scheme for both of the seismic sources and seismic receivers in a pre-selected number of directions, the seismic receivers are deployed in water along towed streamers or within waterbottom nodes, or the seismic receivers are geophones deployed on land, or the seismic receivers are deployed in wells, the seismic data from the seismic receivers are obtained through distributed acoustic sensors using fiber optics cables, the seismic sources are activated together or separated in time along with random and/or periodic time dithers with respect to each other, the optimal seismic survey design enables acquiring simultaneous or sequential seismic data, the spatial or temporal constraints for a source activation process include a quiet time between source activations, the quiet time comprising setting a cap on a minimum or maximum randomized time interval between consecutive shots, and the seismic data includes measurements of one or more of: pressure, particle velocity, displacement, or acceleration wavefields;

(i) generating survey control data, utilizing the optimal seismic survey design, that specifies off-the-grid source-receiver locations and initial shot times for a seismic survey acquisition system;

(j) transmitting the survey control data to a control system that utilizes a processing system in cooperation with a source controller and a synchronization unit to synchronize the seismic sources with a data acquisition system to implement the off-the-grid source-receiver locations and initial shot times;

(k) enabling processing and displaying the seismic data from the seismic survey; and (l) enabling performing a wellsite action based at least on the seismic data.

* * * * *